3,153,597
POLYMERIC DIALDEHYDE-PROTEIN ADHESIVES AND WOOD LAMINATES THEREWITH

Francis B. Weakley and Charles L. Mehltretter, Peoria, Ill., assignors to the United States of America as represented by the Secretary of Agriculture
No Drawing. Filed Nov. 16, 1961, Ser. No. 152,950
3 Claims. (Cl. 106—139)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to greatly improved plywood and similar laminated wood products. More particularly, this invention relates to superior plywood and related laminated wood products that retain very high shear strengths even after being subjected to severe weathering as measured by resistance to boiling water. Still more particularly, this invention relates to exceptionally durable plywood and laminated wood products that owe their resistance against loss of shear strength after weathering as well as their possession of other valuable properties including a nonstain glue line to a novel self-curing glue prepared by reacting a polymeric dialdehyde such as commercially available periodate-oxidized dialdehyde starch (containing about 90 percent or more of theory of aldehyde groups) or dialdehyde cellulose with an animal protein such as casein or a vegetable protein such as soybean protein in certain essential and critical proportions.

This application is a continuation-in-part of copending application Serial No. 69,237, filed November 14, 1960. In the said copending application we have disclosed the preparation of novel paper coating and sizing compositions that resemble the improved wood glue products of the instant application in employing the same protein and polymeric dialdehyde reactants. However, these paper coating and sizing products of the parent application are prepared by reacting the protein at room temperature with 10–20 percent of the polymeric dialdehyde, based on the dry weight of the protein, to form highly specific protein-polymeric dialdehyde copolymers, mildly acid or alkaline coating composition dispersions of which then cure at room temperature to become irreversibly insolubilized, flexible copolymers that are highly resistant to the action of acidic, neutral, and alkaline solutions and confer these values to the paper treated therewith. However, a relatively high proportion of polymeric dialdehyde is required for complete insolubilization of casein at room temperature and economically low proportions of dialdehyde starch were not as effective. It was thus entirely unexpected that such low proportions of dialdehyde starch in dialdehyde starch-casein mixtures could be employed as cold-setting and self-curing glue, particularly for wood laminates for outdoor use wherein the latter are subject to constant weathering and to high shear strains.

In distinction from the paper sizing agents of the said copending parent application, we have now further discovered that we can prepare wood glues that are effective as bonding agents for both indoor and outdoor wood veneers or laminates by reacting a protein such as casein or soybean protein with between 2.5 percent and 5.0 percent of periodate oxidized starch containing at least 90 percent of theory of aldehyde groups.

The structural advantages of first quality plywood and edge- and end-glued laminates bonded with presently available nonstaining glues has resulted in their widespread indoors use. However, such glues are not sufficiently weather resistant to allow their use in the production of plywood and laminates for outdoor construction which is a greatly expanding industry. On the other hand, glues used for exterior plywood are not generally satisfactory for bonding plywood for interior decorative purposes because of the dark glue line produced. For rapid production of such plywood the glue must also have rapid tack and good green bond strength in addition to good dry bond strength. Phenolic polymers such as the phenol-resorcinol resins are widely used as adhesives in plywoods for exterior use, but plywoods bonded with the last mentioned adhesives are not recommended for interior use because of their marked staining tendency.

Casein glues are very well known, but until now it has been necessary to react casein with alkali or lime to obtain good glue strength. However, when such casein glues are used in manufacturing wood laminates, staining of the wood at the glue line occurs, and the glues are not sufficiently resistant to the weathering effects of continued outdoor exposure to permit wood laminates comprising the same to be employed in outside locations. Casein has also been insolubilized with glyoxal or with the lower aliphatic aldehydes such as formaldehyde. However, the glyoxal-casein adhesives are darkly colored, and the necessary handling of the irritant and somewhat toxic volatile aliphatic reagents is rendered particularly unpleasant to the workmen. Furthermore, loss by volatilization requires the use of a large excess during application.

Accordingly, a principal object of the instant invention is the provision of a nonvolatile, nonirritating self-crosslinking or insolubilizing agent for protein adhesives. Another object is an improved, waterproof, cold-setting, wood glue which can be used to prepare wood laminates that do not strain at the glue line and that retain their original very high shear strengths despite prolonged weathering, and thus are suitable for preparing wood laminates regardless of where the laminates are to be used. A further object is the preparation of an aqueous borax dispersion of casein at slightly acid to slightly alkaline pH to which dispersion is added powdered dialdehyde starch with mixing just before spreading of the final glue composition on the wood panels to be laminated. This procedure naturally includes the expedient of coating the wood panels with the aqueous borax dispersion of casein followed by the uniform addition of the powdered dialdehyde starch to the surface of the casein layer prior to assembling and cold pressing the panels to form laminates. A more specific further object is the preparation of a waterproof, cold-setting glue from casein and dialdehyde starch, it being recognized in this connection that a low degree of heat-curing may sometimes be advantageous, particularly when the moisture content of the veneers after gluing and conditioning is high. The above and related objects of this invention will be made clearer in the course of the following disclosure.

Briefly, in accordance with the objects of the instant invention, we have discovered that an aqueous dispersion of dialdehyde starch (starch that has been substantially oxidized by periodic acid so that the oxidized starch polymer contains at least 90 percent and preferably at least about 95 percent of theory of aldehyde groups and consisting essentially of an alternating series of hemiacetal-linked glyoxal and erythrose units), can be reacted at room temperature with an aqueous dispersion of casein, at a pH of between 6–8 (preferably about 6.3), the ratio of dialdehyde starch to the protein being 2.5–5.0 percent, based on the dry weight of protein present. A lowering of the pH retards the reaction and permits a longer pot life whereas raising the pH accelerates the reaction and may produce premature gelation. At pH 7.8 the reaction is so rapid that the product must be used instantly and the plywood must be made on special machines to avoid loss by gelation.

The following specific examples are set forth to more fully describe the practice of the invention.

EXAMPLE 1

Component A was prepared by slowly mixing 15 parts by weight of casein and 2 parts by weight of borax in 83 parts of water and heating to 80° C. for 30 minutes with continuous mixing. After cooling to 25° C., water lost by evaporation was replaced. The solution had a Brookfield viscosity of about 12 poises and a pH of 6.3.

Component B was prepared by adding 5 parts by weight of commercial dialdehyde starch (93 percent dialdehyde content) to 45 parts of water at 60° C., stirring for a few minutes, adding 0.5 part by weight of borax, raising the temperature to 73° C. and continuing the stirring until the dialdehyde starch dissolved. After cooling to 25° C. the solution for convenience was brought up to 50 parts by volume.

The copolymeric casein-dialdehyde starch wood glue adhesive was prepared by mixing 100 parts by volume of component A (15 parts by weight of casein) and 3.75 parts by volume of component B (0.375 part by weight of DAS) (a 40:1 ratio of casein to DAS) at room temperature until a uniform, smooth, nearly colorless, highly fluid paste was obtained having a pH of 6.3 and an initial viscosity of about 12 poises at 25° C.

The above product was spread in an amount equal to 47 lbs. per 1000 sq. ft. of glue line on the facing surfaces of each of two 1/16" birch outer veneer panels and on both surfaces of a center ply panel, and the members sandwiched at 100 lbs. p.s.i. at room temperature for one hour. The plywoods were then conditioned by storing for 7 days at room temperature and 50 percent humidity before testing for dry shear strength. Wet shear strength was measured after soaking in water for 48 hours of continuous immersion, and after the "water boil and dry" cyclic procedure. The results are shown in Table I in which the plywood conditioned as above is designated as "Plywood Treatment 1."

Plywood panels employing the same adhesive were prepared as were the preceding panels but in addition they were then dried at 140° C. for 15 minutes after the previous conditioning step. No glue line was seen even in the panels subjected to the drying step. The plywood members thus treated and designated as "Plywood Treatment 2" in Table I were subjected to the same accelerated tests as were the preceding panels. Control plywoods prepared with casein only (component A) delaminated while being cut for testing or showed substantially no shear strength.

*Table I*

| Plywood Treatment | Dry shear strength, p.s.i. | Wet shear strength, p.s.i. | |
|---|---|---|---|
| | | Continuous immersion test | Water boil and dry cyclic test [1] |
| 1 | 324 | 97 | 55. |
| 2 | 399 | 177 | 105. |
| Casein control (A) | delaminated | delaminated | delaminated. |

[1] Tests for resistance of adhesive bond to water are described in Federal Specification MMM-A-175 "Adhesives; Methods of Testing."

Method 2031, paragraph 4.1, covers the continuous immersion test in which the panels are soaked in distilled water for 48 hours and the strength test made immediately after removal from the water. Paragraph 4.4 of method 2031 describes the water boil and dry cyclic test in which test panels are immersed in boiling water for 4 hours and dried for 20 hours at 62° C. They are then boiled again for 4 hours, cooled in water and the shear strength determined while wet.

EXAMPLE 2

A wood glue was prepared as in Example 1 excepting that component A thereof was adjusted with sodium hydroxide to a pH of 7.8. Plywood panels prepared as in Example 1 were conditioned and then dried at 140° C. for 15 minutes before testing. The data is presented in Table II.

*Table II*

| Plywood Treatment | Dry shear strength, p.s.i. | Wet shear strength, p.s.i. | |
|---|---|---|---|
| | | Continuous immersion test | Water boil and dry cyclic test |
| 2 | 381 | 181 | 126. |
| Casein control | 158 | delaminated | delaminated. |

Additional plywood panels were also subjected to the "cold soak for delamination" test in which the panels are submerged in water at room temperature for 4 hours and then dried at 24°–27° C. for 20 hours, repeating the cycle until the specimens fail or 15 cycles are completed. The average score for 10 panels was 13 cycles, thus exceeding the minimum satisfactory score by 30 percent.

EXAMPLE 3

100 parts by volume of component A of Example 1 was adjusted to pH 7.8 with aqueous sodium hydroxide and 0.75 part by weight of dry dialdehyde starch was mixed therewith, making an actual weight ratio of 0.75 part of the polymeric dialdehyde to 15 parts by weight of casein or one to 20 parts by weight. The mixture had an initial viscosity of 28 poises at 25° C. which increased to about 100 poises in 19 hours. Birch veneer laminated panels prepared as in Example 1 with conditioning alone (designated as Plywood Treatment 1) or conditioned and then heated for 15 minutes (designated as Plywood Treatment 2) were subjected to dry shear and to the water boil and dry cyclic test with the results shown in Table III.

*Table III*

| Plywood Treatment | Dry shear strength, p.s.i. | Wet shear strength, p.s.i. water boil and dry cyclic test |
|---|---|---|
| 1 | 345 | 23. |
| 2 | 465 | 76. |
| Casein control | 245 [1] (395) | delaminated. |

[1] Plywood Treatment 2.

Table IV shows the results of the "cold soak for delamination" test.

*Table IV*

| Number of cycles passed per specimen | Number of specimen panels |
|---|---|
| 5 | 1. |
| 12 | 1. |
| 13 | 3. |
| 15 | 5. |

If the average number of cycles passed by the 10 panels is less than 10 they are classified as defective. The average per panel for the above 10 panels was 13 and thus exceeds the requirements of the test. Calculation of this average is as follows:

$$5 \times 1 = 5$$
$$12 \times 1 = 12$$
$$13 \times 3 = 39$$
$$15 \times 5 = 75$$
Total cycles = 131    Total specimens 10

$\frac{131}{10} = 13.1$ average number of cycles per panel

The results shown in Tables III and IV indicate that the dry and wet shear strengths of plywood glues with casein-dialdehyde starch at pH 7.8 are about the same as the value obtained at pH 6.3 after drying at 140° C. for 15 minutes.

EXAMPLE 4

In the same manner in which we prepared the casein containing component A of Example 1, we separately prepared corresponding A solutions containing respectively 12.5 parts by weight per 100 ml. and 14 parts by weight per 100 ml. of soybean alpha protein. To each of the respective 100 ml. component A solutions was added 3.5 ml. of the component B solution of Example 1, corresponding respectively to 2.8 percent and to 2.5 percent of dialdehyde starch, based on the dry weight of the soybean alpha protein, and the pH of each was adjusted to a value of 7.8. The resulting glue was applied as in Example 1, and the plywood panels were compressed at 150 lbs./sq. in., after which they were conditioned in accordance with the two modifications shown in Example 1 before subjecting them to test, the results of which are shown in Table V and Table VI.

Table V

| Plywood Treatment | 14% Soybean "alpha" Protein | | |
|---|---|---|---|
| | Dry shear strength p.s.i. | Wet shear strength, p.s.i. | |
| | | Continuous immersion test | Water boil and dry cyclic test |
| 1 | 262 | 126 | 131. |
| 2 | 350 | 231 | 145. |
| Protein control (2)[1] | 132 | delaminated | delaminated. |

[1] Plywood Treatment 2.

Table VI

| Plywood Treatment | 12.5% Soybean "alpha" protein | | |
|---|---|---|---|
| | Dry shear strength p.s.i. | Wet shear strength, p.s.i. | |
| | | Continuous immersion test | Water boil and dry cyclic test |
| 2 | 367 | 208 | 168. |
| Protein control (2)[1] | 177 | 58 | delaminated. |

[1] Plywood Treatment 2.

Having disclosed our invention we claim:

1. As a composition of matter, a nonstaining, highly water-resistant, self-curing general purpose plywood glue comprising the room temperature reaction product of an aqueous borax-dispersion containing 100 parts of a protein selected from the group consisting of casein and soybean alpha protein and an aqueous borax-dispersion containing 2.5 to 5 parts, based on the dry weight of the protein, of dialdehyde starch containing at least about 90 percent of theory of aldehyde groups, said reaction product having been formed at a pH of about from 6.0 to not above 7.8.

2. The composition of claim 1 wherein the protein is soybean alpha protein.

3. The composition of claim 1 wherein the protein is casein.

References Cited in the file of this patent

UNITED STATES PATENTS

| | | |
|---|---|---|
| 2,537,114 | Young et al. | Jan. 9, 1951 |
| 2,606,188 | Yelland | Aug. 5, 1952 |